Patented Jan. 27, 1948

2,435,078

UNITED STATES PATENT OFFICE 2,435,078

REARRANGEMENT OF UNSATURATED ALIPHATIC ALCOHOLS

George W. Hearne, El Cerrito, and Donald S. La France, Richmond, Calif., assignors to Shell Development Company, San Francisco, Calif., a corporation of Delaware No Drawing. Application February 12, 1945, Serial No. 577,596

8 Claims. (Cl. 260—642)

This invention relates to a process for the rearrangement of unsaturated alcohols, and more particularly pertains to a process for rearranging an aliphatic allyl-type unsaturated secondary alcohol. In one of its more specific embodiments the invention is directed to the rearrangement of an aliphatic unsaturated secondary monohydric alcohol containing at least four carbon atoms and an olefinic linkage between two carbon atoms, one of which is linked directly to a secondary carbinol group, to the corresponding isomeric unsaturated primary alcohol containing an olefinic linkage between two carbon atoms, one of which is directly linked to a primary carbinol group. This application is a continuation-in-part of our copending application Serial No. 354,706, filed August 29, 1940, which has matured into Patent No. 2,373,956, dated April 17, 1945.

The allylic rearrangement of aliphatic allyl-type unsaturated alcohols, such as crotyl alcohol, methyl vinyl carbinol and the like, has heretofore been considered extremely difficult, if not impossible. In the production of these alcohols and products derived therefrom, there is great need for an economic and efficient process for the conversion of, for example, a primary alcohol to a secondary alcohol isomer or a secondary alcohol to a primary alcohol isomer. This is particularly true because certain processes for the production of unsaturated alcohols result in the formation of reaction products comprising or consisting of a mixture of several isomers. For instance, crotyl chloride and methyl vinyl carbinyl chloride, which are the principal products of the high temperature chlor-substitution of normal butylenes, rearrange on distillation at superatmospheric pressure or during hydrolysis so that a mixture of the corresponding isomeric alcohols is always obtained. In order to produce substantially only the primary or secondary alcohol some method for its controlled and efficient rearrangement and separation is necessary. Such a method is provided by the present invention.

It is an object of the present invention to provide a novel, efficient and economical process whereby aliphatic allyl-type unsaturated secondary alcohols may be allylically rearranged to the corresponding isomeric aliphatic allyl-type unsaturated primary alcohol, and whereby said last-mentioned alcohols may be readily recovered from the reaction product or mixture. It is a further object of the invention to provide a process for the continuous rearrangement of an aliphatic allyl-type secondary alcohol to the isomeric aliphatic allyl-type unsaturated primary alcohol and for the continuous and substantially quantitative recovery of the latter from the reaction mixture.

The aliphatic unsaturated secondary alcohols which may be rearranged or isomerized in accordance with the process of the present invention are characterized by possessing at least four carbon atoms in a chain, two of said carbon atoms being joined by an olefinic linkage while another of said carbon atoms is a saturated secondary carbon atom bearing a hydroxy group and being directly linked to one of the mentioned unsaturated carbon atoms. Such unsaturated alcohols are generally designated as "allyl-type alcohols" since they contain the grouping

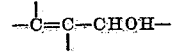

which is characteristic of allyl alcohol and its homologs.

The allyl-type unsaturated secondary alcohols to which the invention is applicable may be represented by the general formula

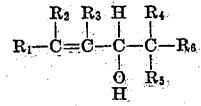

wherein $R_1$, $R_2$, $R_3$, $R_4$, $R_5$ and $R_6$ may represent the hydrogen atom, alkyl radicals or substituted alkyl radicals. The alkyl radicals which $R_1$ through $R_6$ may represent are, for instance, methyl, ethyl, propyl, isopropyl, butyl, isobutyl, tertiary butyl, amyl, hexyl, etc. Representative substituted alkyl radicals which $R_1$ through $R_6$ may represent are the above-listed alkyl radicals or their homologs in which one or more hydrogen atoms have been substituted by a suitable organic or inorganic substituent, such as the halogen atoms, the hydroxy group, the carboxy group, the alkoxy group, and the like. A particularly suitable class of starting materials comprises aliphatic unsaturated secondary monohydric alcohols containing at least four carbon atoms and an olefinic linkage between two carbon atoms, one of which is linked directly to a secondary carbinol group. The following are illustrative examples of allyl-type unsaturated secondary alcohols: butene-1-ol-3, pentene-1-ol-3, hexene-1-ol-3, heptene-1-ol-3, 2-methylpentene-4-ol-3, 2-methylbutene-1-ol-3, and their homologs and suitable substitution products, such as

In accordance with the process of the invention the aliphatic unsaturated secondary alcohol to be rearranged is heated in the presence of a suitable acidic rearrainging medium while maintaining the hydrogen ion concentration of the rearranging medium within a prescribed optimum temperature range, the aliphatic unsaturated primary alcohol thus formed being withdrawn out of contact with such rearranging medium substantially as soon as said alcohol is formed. Suitable rearranging media consist of dilute solutions of a reagent capable of supplying a sufficiently high hydrogen ion concentratin in a solvent having a high dielectric constant, for example dilute aqueous solutions of inorganic acids such as sulfuric acid, hydrochloric acid, phosphoric acid, etc. By correlating the concentration of the hydrogen ions in the rearranging medium with the reaction temperature and the time of contact of the alcohol with such rearranging medium, undesirable side reactions can be reduced to a minimum, and excellent yields of the desired isomeric alcohol may be obtained.

The rearrangement of the aliphatic unsaturated secondary alcohols of the class described herein is preferably effected in an aqueous medium. Nevertheless, other solvents having a dielectric constant substantially as high as that of water may also be used as the solvent for the acid. By heating methyl vinyl carbinol in a 1% aqueous solution of sulfuric acid at atmospheric pressure and substantially at the boiling temperature of the aqueous solution, approximately equilibrium mixtures comprising about 70% methyl vinyl carbinol and about 30% crotyl alcohol may be obtained with a minimum formation of unsaturated ethers. The time of contact required to obtain a desirable concentration of the isomeric alcohol may be reduced substantially by increasing the concentration of the acid in the rearranging medium. Increase in acid concentration, however, generally increases not only the rate of isomerization but also that of the undesired etherification. Therefore, the use of acid solutions having a hydrogen ion concentration in excess of a well-defined limited range set forth hereinbelow will usually result in the formation of excessive amounts of undesirable reaction products. The use of even a trace of concentrated sulfuric acid as the rearranging medium results in the formation of products consisting of a mixture of unsaturated ethers and only small amounts of the desired isomeric alcohol. On the other hand, aqueous solutions having an excessively low hydrogen ion concentration, for example an aqueous solution containing 0.2% or less of sulfuric acid, act extremely slowly and produce but little of the desired isomeric alcohol. These extremely dilute solutions, however, may be used when the reaction is effected at relatively higher temperatures and pressures. It is therefore essential that the hydrogen ion concentration of the rearranging medium be controlled within a well-defined optimum range to obtain economically desirable yields of isomeric alcohols with a minimum of undesired reaction products.

In accordance with the process of the invention the aliphatic allyl-type unsaturated secondary alcohols to be rearranged are contacted with a suitable rearranging medium consisting of a dilute aqueous acid solution having a hydrogen ion concentration in terms of pH values of from 1.23 to 0.3. Although aqueous acid solutions having a hydrogen ion concentration as high as 0.3 (in terms of pH values) may suitably be used, it is preferred to carry out the process with aqueous acid solutions having a pH value in the range of from 1.23 to 0.57, a more preferred range being between about 0.95 and 0.75. For example, an aqueous 0.5% to 4%, preferably a 1% to 2.5%, sulfuric acid solution may be used. Although dilute aqueous sulfuric acid solutions have been selected as suitable rearranging media for the description of the process of the present invention, it is to be understood that the invention is not limited to the use of this acid as the catalyst. Any suitable reagent capable of supplying a hydrogen ion concentration which in terms of pH values is from 1.23 to about 0.3 in aqueous solution may be used. For instance, it is possible to employ dilute aqueous solutions of inorganic acids of which hydrochloride, hydrobromic, phosphoric, pyrophosphoric and dithionic are typical examples. Aqueous solutions of organic acids, e. g. acetic acid, effect the rearrangement only slowly at atmospheric pressure but are more active and may therefore be used, if desired, at higher temperatures by working under superatmospheric pressures. Aqueous solutions of organic acids such as benzene sulfonic acid, naphthalene sulfonic acid, toluene sulfonic acid, and their homologs and analogs may, however, be employed for effecting the desired reactions at atmospheric pressure. Satisfactory results are obtainable by the use of a 5% aqueous ethyl sulfonic acid solution as the rearranging medium for the isomerization of the specified aliphatic unsaturated secondary alcohols to the corresponding primary alcohols. Suitable catalysts may also comprise solutions or suspensions of salts, e. g. sodium bisulfate, sodium bromide, sodium chloride, employed in dilute aqueous solutions of suitable acids.

Although the ratio of the aqueous acid solution to the alcohol to be rearranged may vary within a wide range, it is preferred to use a large excess of the aqueous acid solution. For instance, the volumetric ratio of aqueous acid solution to alcohol may vary from about 1:1 to about 15:1, a preferred range being between about 8:1 and about 12:1 However, if desired, greater proportions of the dilute acid to alcohol may also be employed.

The mixture of the alcohol to be rearranged and of the aqueous acid solution is heated in a suitable rearranging zone at a temperature sufficiently high to effect the desired degree of rearrangement but below the temperature at which substantial formation of undesirable reaction products occurs. The preferred temperature will vary with the nature of the alcohols to be rearranged. Generally speaking, satisfactory results are obtainable when the solution or mixture is maintained at or near the boiling temperature of the rearranging medium. For instance, in the rearrangement of methyl vinyl carbinol to crotyl alcohol satisfactory results have been obtained by heating the rearranging medium (which consisted of a dilute aqueous sulfuric acid solution) to a temperature of about 92° C. at substantially atmospheric pressure. It is to be understood, however, that the rearrangement may also be effected at temperatures which are lower or higher than the atmospheric boiling temperature of the mixture of alcohol and aqueous acid solution. Pressures in excess of atmospheric pressure may suitably be used to maintain all or a major part of the reactants in the liquid phase during the rearranging process. However, as will be pointed out, it is preferred to remove the obtained isomeric alcohol from contact with the rearranging medium substantially as soon as this alcohol is formed. Any suitable type of still, fractionator, heating coil and the like, or a combination of any two or more of these apparatus, may be used as the rearranging zone.

Whatever the type of rearranging zone and operating conditions employed, the time of contact of the alcohol with the rearranging medium is controlled to obtain an optimum yield or concentration of the desired isomeric alcohol while maintaining at a minimum the formation of the undesirable by-products. This contact time should preferably not exceed the minimum time required to attain the equilibrium for a given dilute acid concentration. In the batchwise rearrangement of methyl vinyl carbinol in an aqueous solution of from 0.5% to 4% sulfuric acid at the atmospheric boiling temperature of the reaction mixture, the time of contact is preferably limited so as not to exceed, for instance, a period of time which decreases progressively with the acid concentration used from about 5 hours for a 0.5% acid concentration to about 40 minutes for a 4% acid concentration. Although batch or intermittent methods of operation may be employed, in order to reduce to a minimum the time of contact of the alcohols with the acid and for the purpose of withdrawing the isomeric alcohol from its contact with the acid as soon as such isomeric alcohol is formed in a sufficient concentration, it is preferred to carry out the process of the invention in a continuous manner.

In view of the fact that the unsaturated secondary alcohols of the class specified herein as constituting the starting materials all have boiling temperatures lower than the boiling temperatures of the corresponding isomeric unsaturated primary alcohols formed as a result of the rearrangement, any continuous operation of the process of the invention will necessitate the removal of the obtained isomeric primary alcohol together with at least some of the unreacted secondary alcohol, the latter being then separated from the obtained primary alcohol, as by fractionation, and preferably returned into the same reaction zone or conveyed into another reaction zone. In order to attain this result in a continuous manner and with particular reference to the rearrangement of methyl vinyl carbinol to crotyl alcohol, the former may be continuously introduced into a reactor containing the rearranging medium, such as an aqueous sulfuric acid solution of between about 0.5% and about 4.0% $H_2SO_4$ concentration. The operating conditions, i. e. the reaction temperature, pressure and contact time, may be adjusted in this reactor so as to cause a partial rearrangement of the methyl vinyl carbinol to crotyl alcohol, e. g. to obtain an equilibrium mixture under the operating conditions. The mixture thus formed may then be distilled off either as such or preferably in the form of a mixture of azeotropes containing water, crotyl alcohol and unreacted methyl vinyl carbinol, while leaving the sulfuric acid in the liquid state. The operating conditions should preferably be further adjusted so as to effect this continuous removal of the mentioned overhead fraction containing the crotyl alcohol (as well as the unreacted methyl vinyl carbinol) substantially as soon as the desired concentration of said crotyl alcohol is attained. The overhead fraction may then be continuously or otherwise conveyed into a separate fractionating zone wherein the crotyl alcohol or its water azeotrope is separated as a bottom fraction, the unreacted methyl vinyl carbinol or its water azeotrope being removed as the overhead fraction and returned, if desired, into the reactor for further rearrangement to crotyl alcohol. A modified apparatus for the continuous operation of the process of the present invention may consist of a reactor containing, for instance, the desired or optimum amount of the rearranging medium, e. g. aqueous sulfuric acid solution, into which the alcohol to be rearranged may be introduced continuously at a rate which will assure the maintenance of a ratio of alcohol-to-acid solution within the prescribed limits. The liquid in the still is maintained for a period of time and at a temperature sufficiently high to effect the desired rearrangement. A portion of said alcohol-acid mixture may then be continuously withdrawn into a separate unit, e. g. still, for the purpose of separating, for instance by distillation, the alcohols as such or in the form of their azeotropes from the acid solution. The latter is preferably returned into the reaction zone while the mixture of the alcohols (which consists of or comprises both the isomeric primary alcohol formed and some of the unreacted secondary alcohol withdrawn therewith from the reaction zone) is conveyed to a separate fractionating zone to effect the fractional separation of the alcohols, thereby permitting the recovery of the desired primary alcohol as such or in the form of its water azeotrope. Alternatively, the mixture of alcohols which usually are recovered from the mixture thereof with the acid in the form of their water azeotropes may first be dried and then fractionally distilled. The unreacted secondary alcohol is preferably continuously returned into the reactor for further rearrangement.

With particular reference to the rearrangement of methyl vinyl carbinol to crotyl alcohol by contacting the former with an aqueous sulfuric acid solution, it must be noted that the water azeotrope of methyl vinyl carbinol boils at 86.8° C. whereas the water azeotrope of crotyl alcohol boils at 94.2° C. Therefore, in rearranging the methyl vinyl carbinol in a continuous manner into crotyl alcohol, the methyl vinyl carbinol, with or without water, is continuously introduced into the aqueous sulfuric acid solution maintained preferably at or about its boiling temperature. In order to permit adequate time for the rearrangement, the reaction zone is preferably provided with means for total refluxing of the vapors formed. The liquid mixture continuously withdrawn from this reaction zone and consisting of water, unreacted methyl vinyl carbinol, crotyl alcohol and acid solution is conveyed into the aforementioned distillation (or stripper) zone which is maintained at such a temperature that water azeotropes of both the methyl vinyl carbinol and the crotyl alcohol are removed rapidly and substantially quantitatively as the overhead fraction, while leaving the aqueous acid solution in this stripper or still. When the isomeric alcohol is removed from the rearranging zone and the second still, if such is used, in the form of the water azeotrope of such alcohol, sufficient water should be continuously added to the reactor to maintain the desired hydrogen ion concentration of the rearranging mixture.

Although the invention is described herein in detail with respect to its application to the conversion of methyl vinyl carbinol to crotyl alcohol and to the recovery of the latter from the reaction mixture produced, it is to be understood that the invention is applicable to the rearrangement of all allyl-type unsaturated secondary alcohols of the class described above. Also, the invention is not limited in its application to processes in which but a single alcohol is rearranged, since it is possible to treat mixtures comprising two isomeric forms of a single alcohol to obtain an increase in the proportion of the desired isomer in the resulting mixture, or to the treatment of one isomer to produce the corresponding isomeric form. For instance, the process of the invention is applicable to the rearrangement of a mixture of 2-methylbutene-1-ol-3 and 2-methylbutene-2-ol-1, which alcohols are obtained as a mixture by the hydrolysis of the products obtained during the chlorination of tertiary amylene, the rearrangement of such mixture resulting in the production and recovery of but a single isomer, namely 2-methylbutene-2-ol-1. The conversion of the above mixture to a product consisting of a single isomer by methods available heretofore is difficult and uneconomical. The invention may also be applied to mixtures comprising two or more homologs of an aliphatic unsaturated secondary alcohol or comprising two or more entirely different unsaturated alcohols capable of undergoing rearrangement and the formation of the desired isomeric primary alcohol.

Example I

The reactor employed in this run consisted of a glass vessel heated by means of gas burners and provided with a condenser for the liquefaction of all of the vapors formed in this still. Initially the reactor was charged with about 3900 cc. of a 1-N aqueous solution of methyl vinyl carbinol to which approximately 44 grams of 98% sulfuric acid were added. This resulted in the presence in the reactor of an aqueous sulfuric acid solution of about 1% $H_2SO_4$ concentration. After 60 minutes of initial reaction period, during which time the mixture was heated to about its boiling temperature, the continuous operation was started. For this purpose a 51% aqueous solution of methyl vinyl carbinol was continuously introduced at a rate of about 1.5 cc. per minute, while approximately 65 cc. per minute of the mixture present in the still were continuously withdrawn and introduced into a stripper in which this mixture was subjected to a temperature and pressure sufficient to remove quantitatively and as rapidly as possible (e. g. by flash distillation) the water azeotropes of both the methyl vinyl carbinol and of the crotyl alcohol from the remaining sulfuric acid solution. The latter, amounting to about 57.5 ml. per minute, was continuously recycled into the still. The aqueous azeotropes of the two alcohols were introduced into a fractionator which was heated so that the temperature at its upper end was about 86.8° C. while that in the bottom was slightly below 94.2° C. This resulted in the withdrawal of the water azeotrope of methyl vinyl carbinol from the upper end while a solution consisting of 51% of crotyl alcohol and 49% of water was withdrawn from the bottom at a rate of about 1.5 ml. per minute. The water azeotrope of methyl vinyl carbinol was returned into the still for further reaction and rearrangement to crotyl alcohol. Under such conditions of operation the average residence time of the methyl vinyl carbinol in the reactor was equal to about 60 minutes.

Example II

In a similar run the water azeotropes of the methyl vinyl carbinol and of the crotyl alcohol recovered from the rectifier were salted out and dried with potassium carbonate and then were distilled. The alcohols were thus recovered in an anhydrous state. During the run a total of about 6.5 moles of methyl vinyl carbinol were employed. At the end of the run approximately 4.5 moles of unreacted methyl vinyl carbinol were present in the reactor and the rectifier as well as a result of the distillation of the dehydrated fraction recovered from the latter. Approximately 1.44 moles of crotyl alcohol were produced and recovered as a result of this rearrangement. An analysis of the mixtures in the reactor and in the rectifier showed that the ratios of crotyl alcohol to methyl vinyl carbinol in these two containers were 21:79 and 43:57 respectively. Since the equilibrium in the reactor under standard conditions showed that with a residence time of 60 minutes the conversion to crotyl alcohol is in the neighborhood of about 14%, approximately 0.56 mole of crotyl alcohol should be present in the reactor at all times. Since about 1.44 moles of this alcohol were recovered, the difference (which amounts to a conversion of 34.4%) represents the crotyl alcohol formed by the continuous operation. This conversion may be increased so as to obtain crotyl alcohol substantially quantitatively by employing more suitable equipment and by effecting the reaction and the separation under optimum conditions. Only very small amounts of ethers were produced as a result of the above treatments.

Example III

About 50 parts by volume of methyl vinyl carbinol were mixed with about 500 parts by volume of a 1% aqueous sulfuric acid solution and heated at a temperature of 92° C. for approximately 5 hours in a still equipped with a reflux condenser returning all condensate to the still. The mole per cent composition of the alcohols and ethers separated from the reaction products was found to be as follows:

| | |
|---|---|
| Crotyl alcohol | 24.7 |
| Methyl vinyl carbinol | 71.0 |
| Ethers | 4.3 |

We claim as our invention:

1. A process for effecting the rearrangement of methyl vinyl carbinol to crotyl alcohol, and for the recovery of the latter, which comprises maintaining an aqueous sulfuric acid solution in a reaction zone at a concentration of about 1% and at about its atmospheric boiling temperature, continuously introducing an aqueous solution of methyl vinyl carbinol into the heated acid solution, maintaining said methyl vinyl carbinol in contact with said heated acid solution for a period of time sufficient to effect the rearrangement of a part of the methyl vinyl carbinol to crotyl alcohol, continously withdrawing from the reaction zone a portion of the aqueous acid solution together with the alcohols present therein, continuously subjecting said withdrawn mixture to flash distillation to remove as an overhead fraction the water azeotropes of the crotyl alcohol and of the unreacted methyl vinyl carbinol present in said mixture, continuously separating the crotyl alcohol from said overhead fraction, and continuously returning the unreacted methyl vinyl carbinol into the reaction zone and into contact with the heated aqueous acid solution therein for the rearrangement of additional amounts thereof to crotyl alcohol.

2. The process according to claim 1 wherein the aqueous acid solution remaining as the bottom fraction from the flash distillation step is continuously returned to the reaction zone.

3. A process for effecting the rearrangement of methyl vinyl carbinol to crotyl alcohol, which comprises maintaining an aqueous sulfuric acid solution in a reaction zone at a concentration of from 0.5% to 4% and at about its atmospheric boiling temperature, continuously introducing an aqueous solution of methyl vinyl carbinol into the heated acid solution, maintaining said methyl vinyl carbinol in contact with said heated acid solution for a period of time sufficient to effect the rearrangement of a part of the methyl vinyl carbinol to crotyl alcohol, continuously withdrawing a part of said mixture from the reaction zone, continuously subjecting said withdrawn portion to flash distillation to remove as an overhead fraction the water azeotropes of the crotyl alcohol and of the unreacted methyl vinyl carbinol present therein and separating the crotyl alcohol from said overhead fraction.

4. A process for effecting the rearrangement of methyl vinyl carbinol to crotyl alcohol which comprises maintaining an aqueous sulfuric acid solution at a concentration of from 0.5% to 4% and at about its atmospheric boiling temperature, continuously introducing an aqueous solution of methyl vinyl carbinol into the heated acid solution, maintaining said methyl vinyl carbinol in contact with said heated acid solution for a period of time sufficient to effect the rearrangement of a part of the methyl vinyl carbinol to crotyl alcohol, continuously distilling the crotyl alcohol together with some of the water and unreacted methyl vinyl carbinol from the reaction mixture, continuously separating the crotyl alcohol from the distilled fraction and continuously returning the separated unreacted methyl vinyl carbinol into contact with the heated aqueous acid solution for the rearrangement of additional amounts thereof to crotyl alcohol.

5. A process for effecting the rearrangement of methyl vinyl carbinol to crotyl alcohol which comprises maintaining an aqueous acid solution at a pH value of from 1.23 to 0.57 and at about its atmospheric boiling temperature, continuously introducing an aqueous solution of methyl vinyl carbinol into the heated acid solution, maintaining said methyl vinyl carbinol in contact with said heated acid solution for a period of time sufficient to effect the rearrangement of a part of the methyl vinyl carbinol to crotyl alcohol, continuously distilling the crotyl alcohol together with some of the water and unreacted methyl vinyl carbinol from the reaction mixture, continuously separating the crotyl alcohol from the distilled fraction and continuously returning the separated unreacted methyl vinyl carbinol into contact with the heated aqueous acid solution for the rearrangement of additional amounts thereof to crotyl alcohol.

6. A process for effecting the rearrangement of an aliphatic unsaturated secondary monohydric alcohol containing at least four carbon atoms an an olefinic linkage between two carbon atoms, one of which is linked directly to a secondary carbinol group, to an isomeric unsaturated primary alcohol containing an olefinic linkage between two carbon atoms, one of which is directly linked to a primary carbinol group, which comprises maintaining an aqueous acid solution at a pH value of from 1.23 to 0.57 and at about its atmospheric boiling temperature, continuously introducing the unsaturated secondary alcohol into the heated acid solution, maintaining said unsaturated secondary alcohol in contact with said acid solution for a period of time sufficient to effect the rearrangement of a part of said unsaturated secondary alcohol into the isomeric unsaturated primary alcohol, continuously withdrawing a portion of said mixture from the reaction zone, continuously subjecting said mixture to distillation to remove as an overhead fraction the alcohols present therein, and separately recovering the unsaturated primary alcohols from the thus recovered mixture thereof with the secondary alcohol.

7. A process for effecting the rearrangement of an aliphatic unsaturated secondary monohydric alcohol containing at least four carbon atoms and an olefinic linkage between two carbon atoms, one of which is linked directly to a secondary carbinol group, to an isomeric unsaturated primary alcohol containing an olefinic linkage between two carbon atoms, one of which is directly linked to a primary carbinol group, which comprises maintaining an aqueous acid solution at a pH value of from 1.23 to 0.57 and at about its atmospheric boiling temperature, continuously introducing the unsaturated secondary alcohol into the heated acid solution, maintaining said unsaturated secondary alcohol in contact with said acid solution for a period of time sufficient to effect the rearrangement of a part of said unsaturated secondary alcohol into the isomeric unsaturated primary alcohol, continuously withdrawing said unsaturated primary alcohol together with some water and unreacted secondary alcohol out of contact with the acid solution, and separately recovering said unsaturated primary alcohol from the aqueous mixture thereof with the secondary alcohol.

8. A process for effecting the rearrangement of an aliphatic unsaturated secondary monohydric alcohol containing at least four carbon atoms and an olefinic linkage between two carbon atoms, one of which is linked directly to a secondary carbinol group to an isomeric unsaturated primary alcohol containing an olefinic linkage between two carbon atoms, one of which is directly linked to a primary carbinol group, which comprises maintaining an aqueous acid solution at a pH value of from 1.23 to 0.3 and at about its atmospheric boiling temperature, continuously introducing the unsaturated secondary alcohol into the heated acid solution, maintaining said unsaturated secondary alcohol in contact with said acid solution for a period of time sufficient to effect the rearrangement of a part of said unsaturated secondary alcohol into the isomeric unsaturated primary alcohol, continuously withdrawing said unsaturated primary alcohol together with some water and unreacted secondary alcohol out of contact with the acid solution, and separately recovering said unsaturated primary alcohol from the aqueous mixture thereof with the secondary alcohol.

GEORGE W. HEARNE.
DONALD S. LA FRANCE.

REFERENCES CITED

The following references are of record in the file of this patent:

OTHER REFERENCES

Delaby, "Comptes Rendues," vol. 181, pages 722–4 (1925).

Young, "Journal American Chemical Society," vol. 61, pages 2564–5 (1939).

Baudrenghien, Bull. Soc. Chim Belg, 31, 162–63 (1922). 260–642.